(12) United States Patent
Rohrl et al.

(10) Patent No.: US 9,501,203 B1
(45) Date of Patent: *Nov. 22, 2016

(54) SYSTEM AND METHOD FOR MODIFYING A GAME STATE OF A PLAYER OF A SOCIAL GAME

(75) Inventors: David Rohrl, Pacifica, CA (US); William Henry Kelly Mooney, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/162,027

(22) Filed: Jun. 16, 2011
(Under 37 CFR 1.47)

Related U.S. Application Data (60) Provisional application No. 61/355,214, filed on Jun. 16, 2010.

(51) Int. Cl.
*A63F 13/00* (2014.01)
*G06F 3/0481* (2013.01)

(52) U.S. Cl.
CPC .................. *G06F 3/04815* (2013.01)

(58) Field of Classification Search
CPC ................................... G06F 3/04815
USPC ............................ 463/42; 709/225
See application file for complete search history.

(56) References Cited

U.S. PATENT DOCUMENTS

| | | |
|---|---|---|
| 9,354,700 B1 | 5/2016 | Rohrl et al. |
| 2005/0201290 A1 | 9/2005 | Vasudev et al. |
| 2008/0270038 A1 | 10/2008 | Partovi et al. |
| 2009/0113314 A1 | 4/2009 | Dawson et al. |
| 2009/0254843 A1* | 10/2009 | Van Wie et al. ............. 715/757 |
| 2010/0060649 A1 | 3/2010 | Haggar et al. |
| 2010/0146118 A1* | 6/2010 | Wie ............................. 709/225 |
| 2011/0028219 A1 | 2/2011 | Heatherly et al. |
| 2011/0269540 A1 | 11/2011 | Gillo et al. |

OTHER PUBLICATIONS

"U.S. Appl. No. 13/485,715, Non Final Office Action mailed Nov. 9, 2012", 14 pgs.
"U.S. Appl. No. 13/485,715, Advisory Action mailed Aug. 22, 2013", 2 pgs.
"U.S. Appl. No. 13/485,715, Examiner Interview Summary mailed Aug. 22, 2013", 3 pgs.

(Continued)

*Primary Examiner* — James S McClellan
*Assistant Examiner* — Syvila Weatherford
(74) *Attorney, Agent, or Firm* — Schwegman Lundberg & Woessner, P.A.

(57) ABSTRACT

A system, computer-readable storage medium storing at least one program, and a computer-implemented method for modifying a game state of a player of a social game are presented. A first location of a first virtual object and a second location of a second virtual object in a virtual world of a social game are identified, where the first virtual object is associated with a first social contact of a player of the social game and the second virtual object is associated with a second social contact of the player of the social game. A location adjacency metric for the first virtual object and the second virtual object is determined using the first location and the second location. A social adjacency metric for the first virtual object and the second virtual object is determined. A game state for the player is modified using the location adjacency metric and the social adjacency metric.

21 Claims, 8 Drawing Sheets

(56) References Cited

OTHER PUBLICATIONS

"U.S. Appl. No. 13/485,715, Non Final Office Action mailed Sep. 26, 2014", 20 pgs.
"U.S. Appl. No. 13/485,715, Response filed Jul. 15, 2013 to Final Office Action mailed Apr. 15, 2013", 13 pgs.
"U.S. Appl. No. 13/485,715, Response filed Sep. 16, 2013 to Final Office Action mailed Apr. 15, 2013", 14 pgs.
"U.S. Appl. No. 13/485,715, Final Office Action mailed Jun. 2, 2015", 24 pgs.
"U.S. Appl. No. 13/485,715, Response filed Jan. 26, 2015 to Non Final Office Action mailed Sep. 26, 2014", 23 pgs.
"U.S. Appl. No. 13/485,715, Response filed Jan. 26, 2015 to Non-Final Office Action mailed Sep. 26, 2014", 23 pgs.
U.S. Appl. No. 13/485,715, filed May 31, 2012, System and Method for Modifying a Game State of a Player of a Social Game.
"U.S. Appl. No. 13/485,715, Notice of Allowance mailed Feb. 29, 2016", 6 pgs.
"U.S. Appl. No. 13/485,715, Response filed Aug. 27, 2015 to Final Office Action mailed Jun. 2, 2015", 17 pgs.
U.S. Appl. No. 13/485,715, Final Office Action mailed Apr. 15, 2013, 15 pgs.
U.S. Appl. No. 13/485,715, Preliminary Amendment filed Aug. 10, 2012, 3 pgs.
U.S. Appl. No. 13/485,715, Response filed Feb. 11, 2013 to Non Final Office Action mailed Nov. 9, 2012, 11 pgs.

\* cited by examiner

SYSTEM AND METHOD FOR MODIFYING A GAME STATE OF A PLAYER OF A SOCIAL GAME

RELATED APPLICATIONS

This application claims priority under 35 U.S.C. §119 to U.S. Provisional Patent Application No. 61/355,214 filed 16 Jun. 2010, entitled "Network-Based Social Games with Social and Location Adjacency Feature," by inventors David Rohrl and William Henry Kelly Mooney, which application is incorporated by reference herein in its entirety.

TECHNICAL FIELD

The disclosed embodiments relate generally to modifying a game state of a player of a social game based at least in part on a location adjacency metric and a social adjacency metric.

BACKGROUND

A computed-implemented game may take place a virtual world in which the players of the game interact and the events of the game take place. Depending on the design of the game, the game may have any number of players. Each player of the game may control a character (persona, or avatar) that represents the player within the game. The player's character may be considered the in-game representation of the player who controls this character while playing the game. Additionally, a game may also have non-player characters that are controlled by the game. The game may display graphical representations of the player and non-player characters in a user interface for the game. A game engine (e.g., software executing on a server) for the game may accept control inputs from players of the game, determine actions of the players, decide outcomes of the actions, control the non-player characters, and present game displays that illustrate the progression of the game to the players. The game may present players with various goals (or tasks). As a player performs actions in the game, these actions may bring the player closer to accomplishing these goals. The game engine may keep track of how close or how far each player is from these goals by maintaining a score or other metric for each player. Accordingly, the player may strive to take actions that increase the player's score and/or avoid actions that decrease or do not increase the player's score.

BRIEF DESCRIPTION OF THE DRAWINGS

The embodiments disclosed in the present disclosure are illustrated by way of example, and not by way of limitation, in the figures of the accompanying drawings. Like reference numerals refer to corresponding parts throughout the drawings.

DESCRIPTION OF EXAMPLE EMBODIMENTS

The description that follows includes example systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for modifying a game state of a player of a social game based at least in part on a location adjacency metric and a social adjacency metric.

In some embodiments, a first location of a first virtual object and a second location of a second virtual object in a virtual world of a social game is identified, where the first virtual object is associated with a first social contact of a player of the social game and the second virtual object is associated with a second social contact of the player of the social game. A location adjacency metric for the first virtual object and the second virtual object is determined using the first location and the second location. A social adjacency metric for the first virtual object and the second virtual object is determined. A game state for the player is modified using the location adjacency metric and the social adjacency metric.

Figure 1:
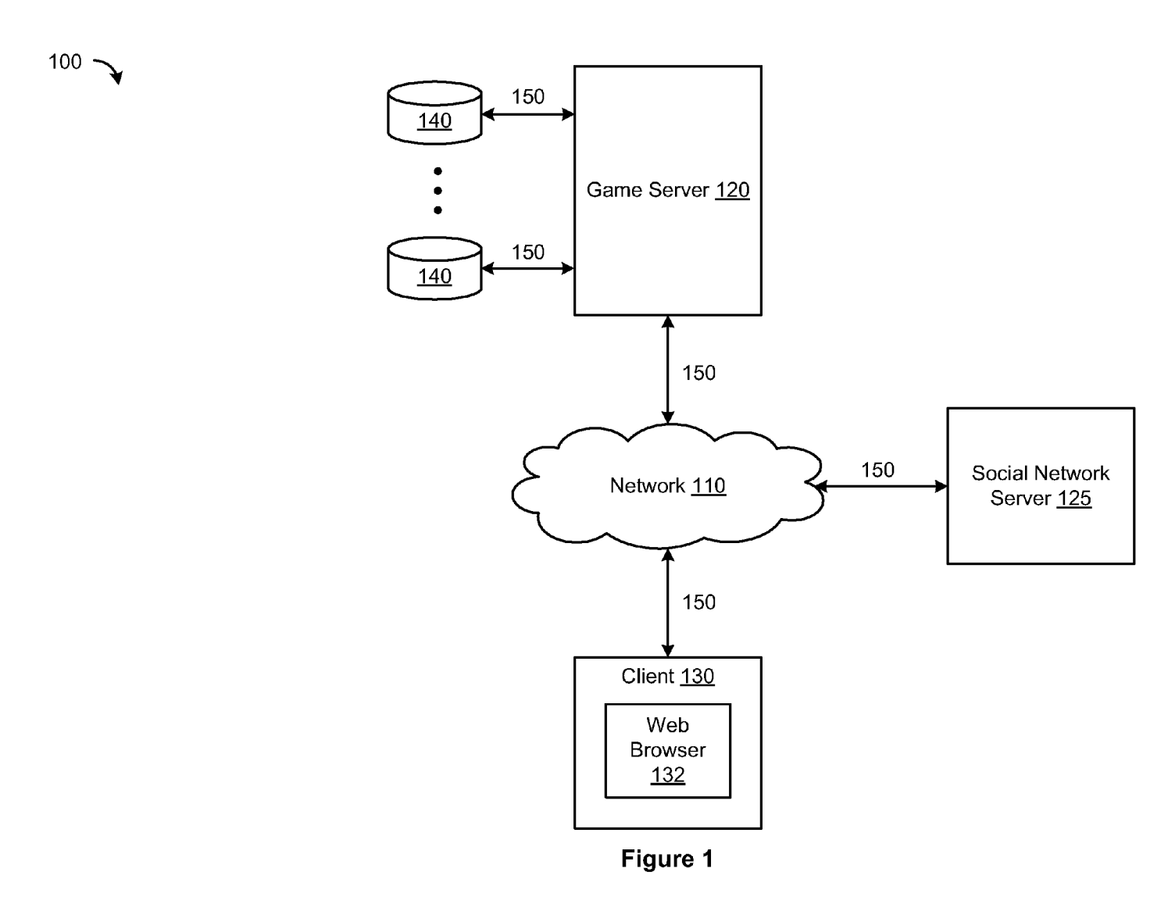
FIG. 1 illustrates an example network environment, according to some embodiments.

FIG. 1 illustrates an example network environment 100, according to some embodiments. The network environment 100 includes a network 110 coupling a game server 120, a social network server 125, and a client 130 to each other. Network 110 can generally include any type of wired or wireless communication channel capable of coupling together computing nodes. This includes, but is not limited to, a local area network (LAN), a wide area network (WAN), or a combination of networks. In some embodiments, network 110 includes the Internet.

One or more links 150 may couple the game server 120 or the client 130 to network 110. Each link 150 may include, but is not limited to, wireline, wireless, and/or optical links. Furthermore, each link 150 may include, but is not limited to, an intranet, an extranet, a VPN, a LAN, a WLAN, a WAN, a MAN, a portion of the Internet, or another link 150 or a combination of two or more such links 150.

In some embodiments, the game server 120 hosts one or more games (e.g., a social game) from one or more game publishers. For example, the game server 120 may host one or more game engines and/or game data for games. In some embodiments, the game server 120 includes hardware, software, or embedded logic components or a combination of two or more such components for carrying out the appropriate functionalities implemented or supported by the game server 120.

In some embodiments, one or more data stores 140 are communicatively linked to the game server 120 via one or more links 150. The data stores 140 may be used to store various types of information. In some embodiments, the information stored in the data stores 140 may be organized according to specific data structures. In some embodiment, each data store 140 is a relational database.

The client 130 may be an electronic device including hardware, software, or embedded logic components or a combination of two or more such components and capable of carrying out the appropriate functionalities implemented or supported by the client 130. For example and without limitation, the client 130 may be a desktop computer system, a notebook computer system, a netbook computer system, a handheld electronic device, or a mobile telephone. The client 130 may enable a player at the client 130 to access network 110.

The client 130 may include a web browser 132 and may have one or more add-ons, plug-ins, or other extensions that provide additional functionality not included in the web browser 132. The player may enter a Uniform Resource Locator (URL) or other address into the web browser 132 directing the web browser 132 to the game server 120. The web browser 132 may generate a Hyper Text Transfer Protocol (HTTP) request and communicate the HTTP request to the game server 120. The game server 120 may accept the HTTP request and communicate to the client 130 one or more Hyper Text Markup Language (HTML) files and/or code (e.g., scripts) responsive to the HTTP request. The client 130 may render a web page based on the HTML files and/or code received from the game server 120 for presentation to the user. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like.

Note that although FIG. 1 illustrates a single instance of the game server 120, the network environment 100 may include any number of game servers. For example, the game server 120 may be one of a plurality of distributed game servers (e.g., multiple game servers in a single data center, multiple game servers distributed across multiple geographic locations). The network environment 100 may also include other game servers for other game publishers. Similarly, although FIG. 1 illustrates a single instance of the social network server 125, the network environment 100 may include any number of social network servers. For example, the social network server 125 may be one of a plurality of distributed social network servers (e.g., multiple social network servers in a single data center, multiple social network servers distributed across multiple geographic locations). Furthermore, although FIG. 1 illustrates a single instance of the client 130, the network environment 100 may include any number of clients.

The functionality of the game server 120 is described in more detail below with reference to FIGS. 2-8 below.

A social game is a game whose game mechanics leverage social interactions and/or a social network of the players of the games. Each player of the game may control a character (persona, or avatar) that represents the player within the game. Thus, a character is the in-game representation of a player of the game and is controlled by the player (e.g., through player inputs to the social game). The players of the game may interact with each other within the game through their representative characters. In addition, the social game may have one or more non-player characters. Some or all of such non-player characters may be proxies for respective social contacts of a player in the game. In some embodiments, the social game provides a virtual world in which the players of the game interact and the events of the game may take place. In the virtual world, the players of the game may form social connections and communities through their corresponding characters. The players of the game may socialize with each other within the social game by directing their characters to interact with each other. In some embodiments, a social game is a computer-implemented and a network-based game. In these embodiments, the players may play the game from different locations over a computer network (e.g., the Internet). For example, a network-based social game may be executed in the web browsers executed on the network devices (e.g., computers or smart phones) used by the players. The players may access the game by visiting a specific network address (e.g., a URL for a web page or a website).

In some embodiments, the social game is a text-based game implemented as a series of web pages that are returned after a player performs one or more actions in the game. In some embodiments, the social game is a turn-based game implemented as a series of web pages that are returned after a player performs one or more actions in the game. In some embodiments, the social game is an animated (or rendered game) executable as a standalone application. In some embodiments, the social game is an animated (or rendered game) executable within the context of a web page or other structured document (e.g., executable in the web browser 132). In some embodiments, the social game may be implemented using a multimedia-platform (e.g., ADOBE FLASH). For example, the game may be implemented at least in part using a multimedia object for the multimedia-platform (e.g., SWF object) that is embedded in a web page and executable in the web browser by a media player plug-in for the multimedia-platform (e.g., a FLASH media player). In some embodiments, one or more web pages are associated with a networking system or networking service (e.g., a social networking website, a game network). Note that the term "player" may be used to refer to an individual, a group, or an entity (such as a business or third-party application).

Social games are one way for people to socialize with each other and entertain themselves over computer networks. Similarly, network-based social networking systems also enable their members to establish social connections among themselves and facilitate communications among their members. For example, a social networking website may enable people to establish user accounts with the social networking website (e.g., becoming its members) and interact with other members of the website. Each member of the social networking website may identify any number of other members of the website as the member's "friends", socially connecting the member with the member's identified friends. As a result, the members of the social networking website, together with their friend connections, may form a social network.

Figure 2:
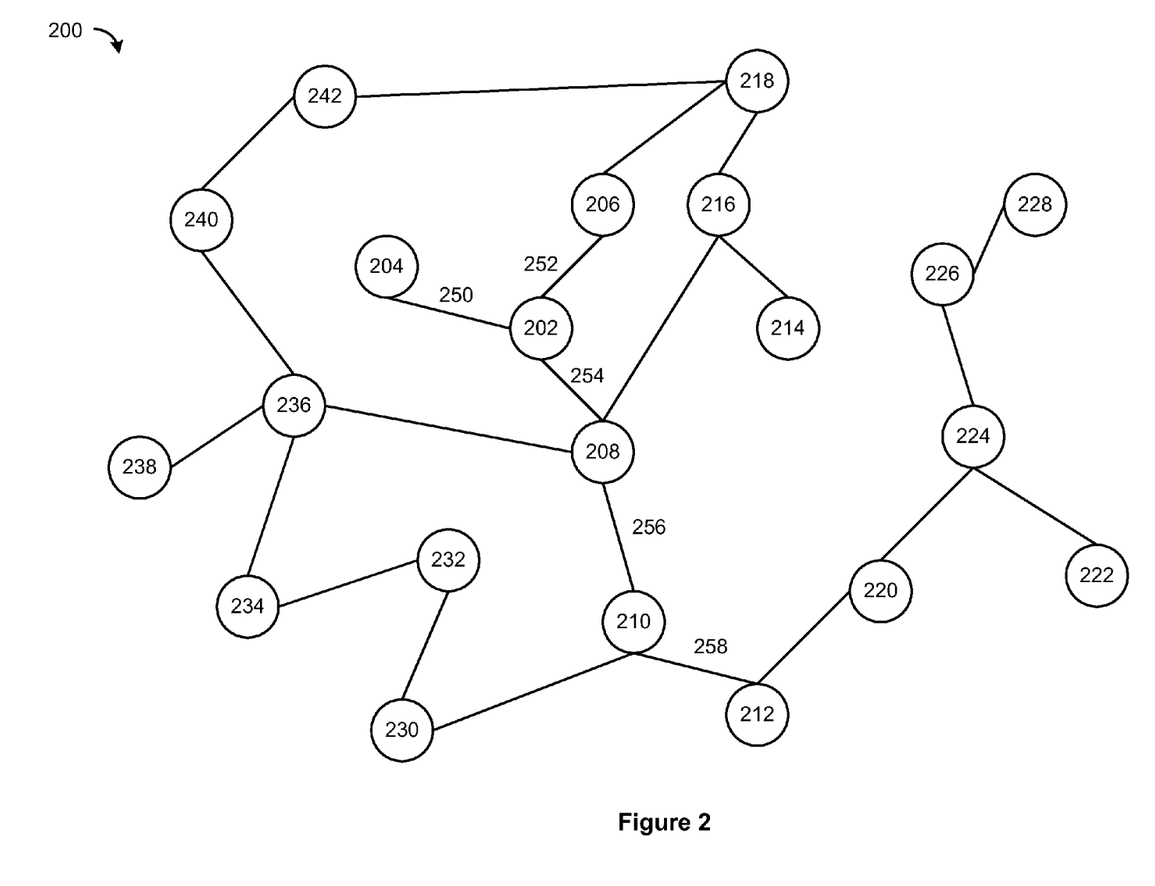
FIG. 2 illustrates a graphical representation of an example social network, according to some embodiments.

FIG. 2 illustrates a graphical representation of an exemplary social network 200 associated with a social networking website, according to some embodiments. Note that the social network 200 may sometimes be referred to as a "social graph." The social network 200 includes nodes 202-242 where each node represents a member of the social networking website. Two members who are friends to each other are connected with an edge (e.g., edges 250, 252, 254, 256, 258).

The social network 200 may identify various relationships connecting the members of the social network. For example, a particular member of the social network 200, represented by a node in a social network, may be friends to several other people. In the social network 200, the member represented by the node 202 has three friends: the members represented by the nodes 204, 206, and 208 indicated by edges 250, 252, and 254, respectively. Thus, the members represented by the nodes 204, 206, and 208 share a common friend represented by the node 202. In other words, the member represented by the node 202 is a "mutual friend" of the members represented by the nodes 204, 206, and 208.

As another example, although there is no edge directly connecting the nodes 202 and 210 (e.g., nodes 202 and 210 are not direct friends to each other), the members represented by the nodes 202 and 210 share a common friend (e.g., member) represented by the node 208 as indicated by the edges 254 and 256. Therefore, the members represented by the nodes 202 and 210 may be considered to be indirectly connected via the member represented by the node 208. Similarly, although there is no edge directly connecting nodes 202 and 212, the members represented by the nodes 202 and 212 nevertheless may be considered to be indirectly connected via the members represented by the nodes 208 and 210 as indicated by the edges 254, 256, and 258. If two members are directly connected (e.g., the members represented by nodes 202 and 208), they may be referred to as "first-degree" friends. If two members are indirectly connected with one member linking them (e.g., the members represented by nodes 202 and 210), they may be referred to as "second-degree" friends. If two members are indirectly connected with two members linking them (e.g., the members represented by nodes 202 and 212), they may be referred to as "third-degree" friends, and so on.

In some embodiments, in the context of a social network, a social adjacency of two members indicates a social distance of the two members. The social distance of two members corresponds to the a shortest distance (e.g., the least number of connecting nodes) between nodes representing the two members. For example, if two members are directly connected (e.g., first-degree friends such as the members represented by the nodes 202 and 208), these two members may be considered to have first-order social adjacency. Alternatively, if the two members are separated by two nodes (e.g., third-degree friends such as the members represented by the nodes 202 and 212), these two members may be considered to have third-order social adjacency.

Table 1 illustrates an example "friend lists" for two example members of a social network, Scott and Megan, both of whom are friends of a given player. Based on these two friend lists, it may be determined that Ann and Michael are friends to both Scott and Megan, and therefore are mutual friends to Scott and Megan.

TABLE 1

Example Friend Lists

| Scott's Friend List | Mutual Friend | Megan's Friend List |
|---|---|---|
| Megan | | Scott |
| Joy | | Fred |
| Gerry | | John |
| Ann | Ann | Ann |
| Michael | Michael | Michael |

When members of a social network play the same social game, these members of the social network become players of the social game. In some embodiments, the social game may utilize the players' social connections within a social network (e.g., the social network 200) to further enhance the players' game experience. For example, in some social games, the game logic may access the social network of a player to identify one or more of the player's friends and use their identities to generate non-player characters that act as proxies for the player's friends. These proxies are non-player characters that represent a player's friends, but whose actions are controlled by game logic (e.g., the game engine). Additionally, the players' social connections within the social network may be incorporated into the game logic of the social game.

Similar to the real world, the virtual world provided by a social game may also include many locations. Since these locations are within the virtual world, they may be referred to as "virtual locations". The characters of the social game may occupy specific virtual locations within the virtual world at any given time and may move around, and/or be placed in, different virtual locations as the game progresses. Also similar to the real world, the virtual locations inside a virtual world may be separated by distances, and some virtual locations are close or adjacent to one another and some virtual locations are far from one another. Note that the term "location" in the context of a virtual world may be used interchangeably with the terms "virtual location."

In some embodiments, a location adjacency of two virtual locations indicates a distance between two virtual locations inside the virtual world. If two characters occupy two virtual locations that are adjacent to each other in the virtual world (e.g., the boundaries of the virtual locations touch each other), the location adjacency of the two characters is deemed to be close. For example, if a virtual world is a two-dimensional grid (or a three-dimensional matrix) of virtual locations, adjacent virtual locations (e.g., grid elements whose boundaries or edges are touching each other) may be considered to have first-order location adjacency, virtual locations separated by one grid unit (e.g., one virtual location) may be considered to have second-order location adjacency, and so on. In some embodiments, the social game incorporates both the characters' social adjacency within a social network and the virtual locations' location adjacency within the virtual world.

Figure 3:
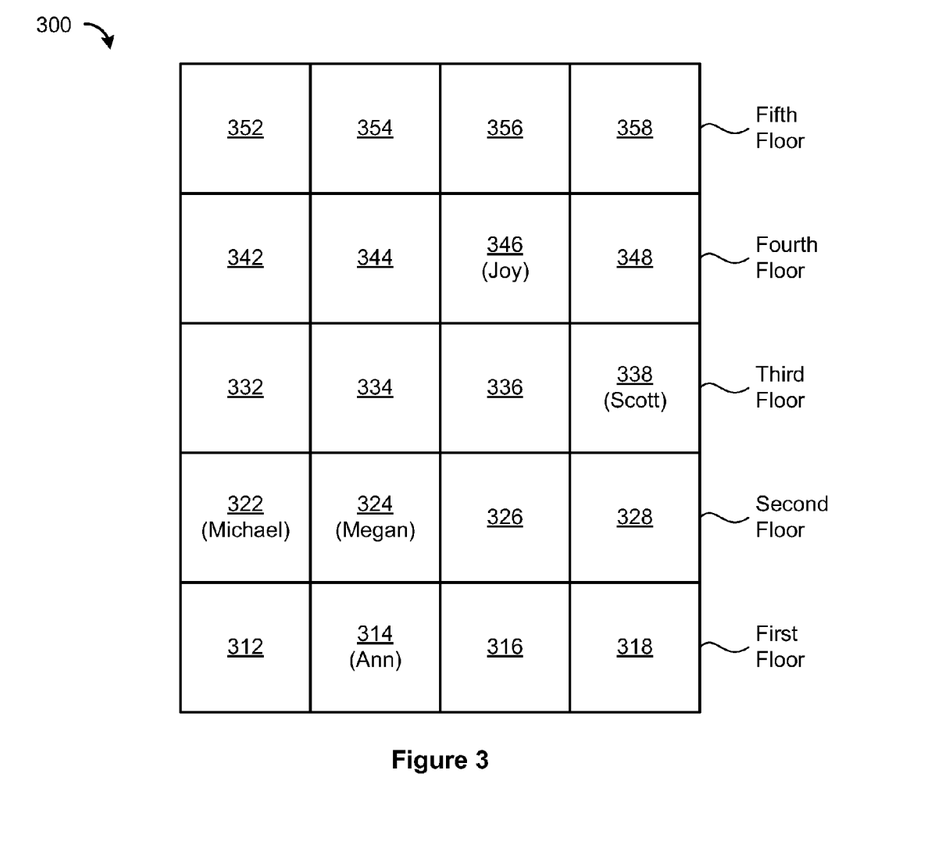
FIG. 3 illustrates an example social game scenario, according to some embodiments.

To clarify the concepts of location adjacency and social adjacency, consider an example game scenario involving the operation of an apartment building. Assume that a player is an owner of an apartment building that has multiple units. At the start of the social game, the apartment building may have one floor with two units. As the social game progresses and the player moves up in game level, the number of units and floors of the apartment building may increase. FIG. 3 illustrates an example apartment building 300 that has five floors where each floor has four units (e.g., the first floor includes units 312-318, the first floor includes units 322-328, the first floor includes units 332-338, the first floor includes units 342-348, the first floor includes units 352-358). Each unit may house a tenant, which may be another player of the social game. In this example, apartment building 300 may be considered the virtual world of the social game, and the units within apartment building 300 may be considered the specific virtual locations within the virtual world that may be occupied by the characters of the social game. Some units (e.g., units 332 and 334) are adjacent to each other in terms of their locations in apartment building 300 and some units (e.g., units 312 and 358) are farther from each other (e.g., not adjacent to each other) in terms of their location in the apartment building 300.

In this example game scenario, the goal of the social game may be to keep the tenants in the apartment building 300 happy. For example, the social game may determine that a happy tenant is a tenant that pays rent and an unhappy tenant is a tenant that does not pay rent. The social game may specify that one way for the player to keep the tenants in the apartment building 300 happy may be to place those tenants who are socially adjacent to each other (e.g., the tenants who are friends within a social network) in units of the apartment building 300 that are adjacent to each other in the apartment building 300. In some embodiments, the social game tracks a tenant's happiness using a happiness metric (e.g., a numerical value) that is calculated using various game parameters as inputs. For example, in this example game scenario (e.g., the apartment game), the game parameters may include the size of the unit, the floor on which the unit is located, the type and number of virtual objects located within the unit, and the like. This "happiness" metric can be used to modulate the behavior of the tenant.

Referring to the example social game described above, FIG. 4 illustrates an example method 400 that incorporates the players' social connections within a social network into the game logic of a social game, according to some embodiments. The social game allocates, to a player, an apartment building that has multiple units (e.g., the apartment building 300) (operation 402). The units of the apartment building may be used to house other players of the game (e.g., tenants of the apartment building). The social game then presents the player with a new tenant (e.g., another player or a non-player character representing a social contact of the player) that wants to move into the apartment building (operation 404).

Figure 4:
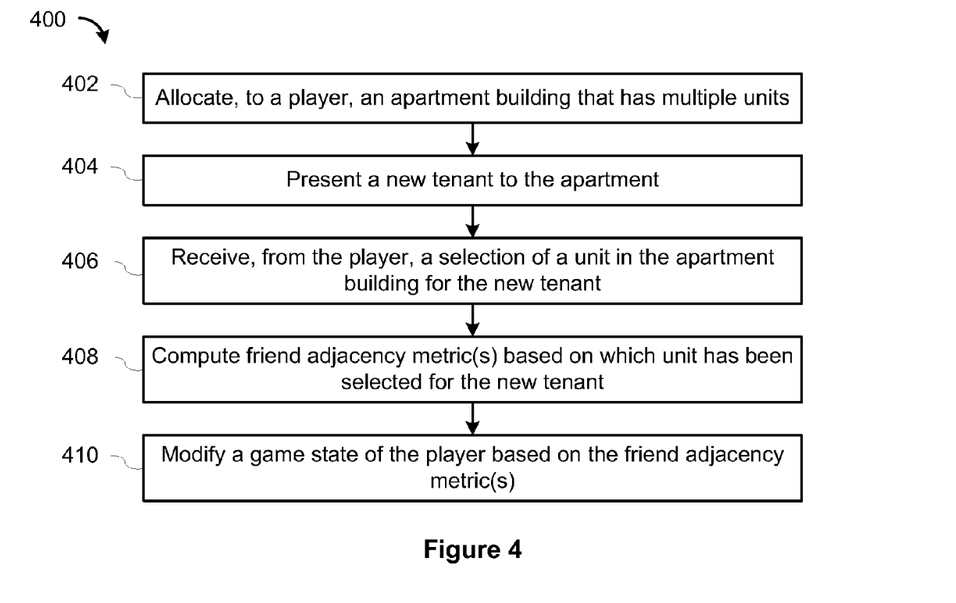
FIG. 4 illustrates an example method that incorporates the players' social connections within a social network into the game logic of a social game, according to some embodiments.

The social game then receives, from the player, a selection of a unit in the apartment building for the new tenant (operation 406). The new tenant may be a social contact of the player in a social network (e.g., the social network 200). Note that the player may have several choices when selecting a unit for the new tenant. First, the player may randomly select a unit that is not currently occupied and assign it to the new tenant. However, the new tenant may not be happy with this kind of selection as the new tenant may wish to have a specific unit inside the apartment building. Since the goal of the social game for the player is to keep the tenants in his apartment building happy, randomly selecting an unoccupied unit may not help advance the owner-player's game goal. Alternatively, the player may select a unit that is adjacent to another unit that is currently occupied by another tenant who is a friend of the social contact in the social network (e.g., the two tenants are socially adjacent). The new tenant may be happy occupying a unit close to a unit occupied by the new tenant's friend, and in turn, this selection may help advance the player's in-game goals (e.g., increasing the player's score.

The social game may then calculate a friend adjacency metric (FAM) based on which unit has been selected for the new tenant (operation 408). Note that the social game may calculate a FAM for all tenants in the apartment building based on the selection of a unit for the new tenant. The social game may then modify a game state (e.g., a game score) of the player based on the FAM(s) (operation 410).

In some embodiments, the location adjacency and the social adjacency of characters (e.g., tenants) are used to determine a happiness metric for the characters. The happiness metric may be an input into other metrics or game mechanics that control character behavior in the social game.

In some embodiments, a friend adjacency metric (FAM) is computed for each character in the game. The FAM may be used to modify operation of one or more aspects of the game (e.g., game states of players, game mechanics). In some embodiments, the FAM for a given in-game character j is computed using the equation:

$$FAM(j) = \sum_{i=1}^{N} Ld_{i,j} \times Sa_{i,j}$$

where $Ld_{i,j}$, a location adjacency metric, is a function that varies inversely to the distance between two characters i and j in the virtual world, and $Sa_{i,j}$, a social adjacency metric, is a function that varies inversely to the social distance between two characters i and j. In social games where locations in the virtual world are defined relative to a grid or a matrix, $Ld_{i,j}$ may be equal to a predetermined value (e.g., a maximum distance between any two characters or units in the virtual world) minus (or divided by) the distance between character j and character i. For example, if character i and j are in adjacent units, the distance between them is one, thus yielding a maximum value for $Ld_{i,j}$. In some embodiments, $Ld_{i,j}$ returns a minimum value of zero if the distance between character i and j is greater than the maximum value. $Sa_{i,j}$ can be equal to a maximum value (e.g., a maximum value) minus (or divided by) a value characterizing the social degrees of separation between character j and character i. As discussed above, the social contacts represented by character i and j may be first degree friends, second degree friends, and so on. In some embodiments, if the social contacts represented by characters i and j are first-degree friends, the function $Sa_{i,j}$ returns a maximum value (e.g., Sa-max/1). In addition, if the social contacts represented by characters i and j are second-degree friends, the function $Sa_{i,j}$ may return half the maximum value (e.g., Sa-max/2), and so on.

The resulting FAM(j) value may be used as an input to other algorithms and/or metrics that affect game state and/or game mechanics (e.g., a happiness algorithm of a character, a point score, other in-game benefits to be awarded to the player). Still further, the FAM values for all in-game characters may be aggregated (e.g., average, mean, sum) and used as inputs to algorithms that control game state and modify the game mechanics of the social game. For example, referring to FIG. 3, assume that in the apartment building 300, the units 314, 322, 324, 338, and 346 have already been occupied by five tenants, Ann, Michael, Megan, Scott, and Joy, respectively. Furthermore, assume that a new tenant, Phil, wants to move into the apartment building 300, and that Phil is friends with Megan, Joy, and Scott within a social network (e.g., the social network 200). If the player randomly selects an unoccupied unit (e.g., the unit 318) for Phil, Phil may not be happy because the unit 318 is not adjacent to (or near) units 324, 338, and 346, which are occupied by Phil's friends in the social network. Accordingly, the social game may not give the player any in-game advantages (e.g., points, tenants with higher happiness metrics) for this selection. Similarly, if the player selects a unit (e.g., the unit 316) close to a unit occupied by a tenant (e.g., the unit 314 occupied by Ann) who is not Phil's friend within the social network, Phil may not be happy either. Accordingly, the social game may not give the player any in-game advantages (e.g., points, tenants with higher happiness metrics) for this selection. Alternatively, if the player selects a unit (e.g., the unit 334) adjacent to (or close to) a unit occupied by a tenant (e.g., the unit 324 occupied by Megan) who is Phil's friend within the social network, both Phil and tenant (e.g., Megan) may be happy. The social game may consider this selection better than the previous two selections because this selection makes two of the tenants happy. Accordingly, the social game may give the player in-game advantages (e.g., points) for this selection. However, if the player selects a unit (e.g., the unit 336) close to all the units occupied by all the tenants (e.g., the units 324, 338, and 346 that occupied by Megan, Scott, and Joy) who are Phil's friends within the social network, Phil and these tenants (e.g., Megan, Scott, and Joy) may all be happy. The social game may consider this selection the best selection because the selection makes many of the tenants happy. Accordingly, the social game may give the player maximum in-game advantages (e.g., points).

For the example scenario involving the apartment building 300, in addition to assigning units to the tenants by considering the social adjacency of the players and the location adjacency of the units, the player may perform other actions that may also keep the tenants happy. In some embodiments, a happiness metric may be computed based on an algorithm having a FAM value component and components that consider other game state attributes. For example, various things in the apartment building may break down (e.g., pipes leaking, window broken, toilets clogging). The social game may dictate that these problems make the tenants unhappy. If the player resolves these problems in a timely fashion, the game logic may reward the player accordingly (e.g., giving the player points). Conversely, if the player ignores these problems, the social game may penalize the player (e.g., deducting points, decreasing happiness metrics for one or more tenants). The player may also provide various types of entertainment to the tenants, which may also cause the social game to give the player points. The player may hire other players who are friends to some of the tenants as employees to help the player take care of the apartment building. Note that these players may not necessarily be the tenants of the apartment building. Again, the social game may consider this a beneficial action since the tenants may welcome the chance to socialize with these other players, who are their social friends, within the apartment building game environment. The player may install various functional or decorative items in the apartment building (e.g., carpet in the hallway, paintings in the entrance area), which may improve the environment inside the apartment building and in turn make the tenants happy.

Note that a game involving the operation of a virtual apartment building is just one example where the players' social adjacency within a social network may be associated with the players' location adjacency within a virtual world of a social game. The same concept may be applied to other social games. For example, instead of an apartment building, the virtual world may include a hotel having multiple floors where each floor has multiple rooms. The guests of the hotel may be assigned to specific rooms, and the social game may prefer that those guests who are friends (or socially adjacent) to each other are assigned to rooms that are adjacent to each other. Similarly, a shopping mall may have multiple store spaces, and the social game may prefer that those merchants who are friends (or socially adjacent) to each other are assigned to store spaces that are adjacent to each other.

In some embodiments, the players of a game may form social connections within the social game. For example, a social game may enable its players to identify other players as their friends, which may be similar to the way a social networking system enables its members to identify other members as their friends. In this case, the social connections formed among the players within the social game itself may be used to determine the social adjacency among the players.

In some embodiments, the social connection between two contacts that have both a social connection in the social game and a social connection in a social network (e.g., external to the social game) is considered a stronger connection than connections involving either type of connection individually. Thus, in these embodiments, a social adjacency metric may be more strongly weighted or otherwise have more effect in modifying operation of the social game and/or a game state of a player of the game.

In some embodiments, the game mechanics for the social game are modified based on a social adjacency metric and a location adjacency metric that are calculated for a particular action performed by the player (e.g., placing a new tenant in a unit of an apartment building). For example, downstream tasks and/or goals may be modified based on the social adjacency metric and the location adjacency metric.

The social adjacency metrics and the location adjacency metrics enhance gameplay in a social game because the player's game state (e.g., score, experience points) is directly affected by decisions that the player makes in terms of the positioning of characters and/or virtual objects in a virtual world of the social game. For example, consider another game where a first player invites a second player, who is friend to the first player, to operate a ride. Without considering the social adjacency and the location adjacency of these players, there is no gameplay or strategy to the invitation action. Instead, the invitation is purely viral in nature as it includes a real-world friend in the online game activity, with the hope that the friend will be intrigued and choose to get more actively involved at some point. In contrast, combining the concepts of social adjacency and location adjacency in a social game adds a level of gameplay to this viral action. Since a player benefits by placing other players (e.g., the player's friends) in the correct location (e.g., near their social friends) in the virtual world, it is no longer a random selection in terms of which friends to invite and where to place these friends in the virtual world.

Figure 5:
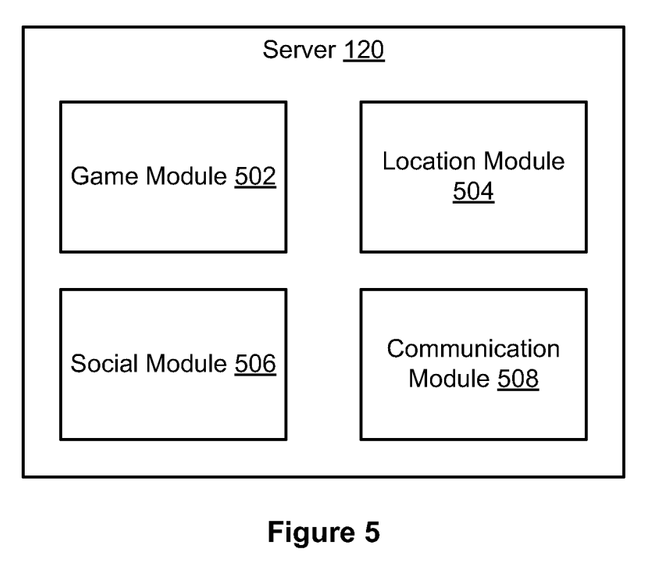
FIG. 5 illustrates a game server, according to some embodiments.

FIG. 5 illustrates the game server 120, according to some embodiments. The game server 120 includes a game module 502, a location module 504, a social module 506, and a communication module 508. The game module 502 is configured to modify a game state for a player of a social game using a location adjacency metric and a social adjacency metric. The location module 504 is configured to determine a location adjacency metric for a virtual object (e.g., a character) in the virtual world. The social module 506 is configured to determine a social adjacency metric for a social contact corresponding to the virtual object. The communication module 508 is configured to transmit and/or receive data and/or commands from other computer systems via network 110.

Figure 6:
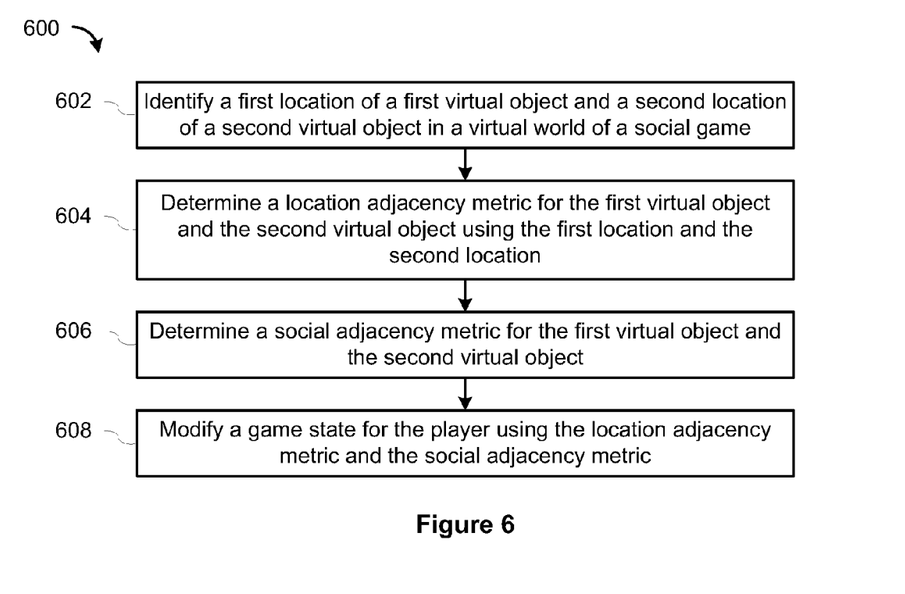
FIG. 6 illustrates an example method for modifying a game state of a player of a social game, according to some embodiments.

FIG. 6 illustrates and example method 600 for modifying a game state of a player of a social game, according to some embodiments. The location module 504 identifies (operation 602) a first location of a first virtual object and a second location of a second virtual object in a virtual world of a social game, where the first virtual object is associated with a first social contact of a player of the social game and the second virtual object is associated with a second social contact of the player of the social game. For example, the first virtual object may be a first character for a first social contact of the player (e.g., a friend of the player) and the second virtual object may be a second character for a second social contact of the player. Thus, the location module 504 identifies a first location of the first character and a second location of the second character in the virtual world of the social game.

The location module 504 determines (operation 604) a location adjacency metric for the first virtual object and the second virtual object using the first location and the second location, where the location adjacency metric is a function of a distance between the first location and the second location in the virtual world. Continuing the example from above, the location module 504 determines a location adjacency metric using a distance between a first location and the second location.

The social module 506 determines (operation 606) a social adjacency metric for the first virtual object and the second virtual object, where the social adjacency metric is a function of a social distance between the first social contact and the second social contact in a social network. Continuing the example from above, the social module 506 determines a social distance between the first social contact and the social contact (e.g., first-degree friends).

The game module 502 modifies (operation 608) a game state for the player using the location adjacency metric and the social adjacency metric. For example, the game module 502 may increase the player's score by a first predetermined amount if the first virtual object and the second virtual object are placed at adjacent locations when the first social contact and the social contact are first-degree friends. Alternatively, the game module 502 may decrease the player's score by a second predetermined amount if the first virtual object and the second virtual object are placed at adjacent locations when the first social contact and the social contact are first-degree friends.

In some embodiments, when modifying the game state for the player using the location adjacency metric and the social adjacency metric the game module 502 rewards the player when the location adjacency metric for the first virtual object and the second virtual object indicates that the first location and the second location are within a first predetermined distance of each other in the virtual world and when the social adjacency metric for the first social contact and the second social contact indicates that the first social contact and the second social contact are within a second predetermined social distance of each other in the social network.

In some embodiments, when modifying the game state for the player using the location adjacency metric and the social adjacency metric, the game module 502 penalizes the player when the location adjacency metric for the first virtual object and the second virtual object indicates that the first location and the second location are not within a first predetermined distance of each other in the virtual world and when the social adjacency metric for the first social contact and the second social contact indicates that the first social contact and the second social contact are within a second predetermined social distance of each other in the social network.

In some embodiments, when modifying the game state for the player using the location adjacency metric and the social adjacency metric, the game module 502 increases a happiness metric for the first virtual object and the second virtual object when the location adjacency metric for the first virtual object and the second virtual object indicates that the first location and the second location are within a first predetermined distance of each other in the virtual world and when the social adjacency metric for the first social contact and the second social contact indicates that the first social contact and the second social contact are within a second predetermined social distance of each other in the social network.

In some embodiments, when modifying the game state for the player using the location adjacency metric and the social adjacency metric, the game module 502 decreases a happiness metric for the first virtual object and the second virtual object when the location adjacency metric for the first virtual object and the second virtual object indicates that the first location and the second location are not within a first predetermined distance of each other in the virtual world and when the social adjacency metric for the first social contact and the second social contact indicates that the first social contact and the second social contact are within a second predetermined social distance of each other in the social network.

Example System for Social Game

Figure 7:
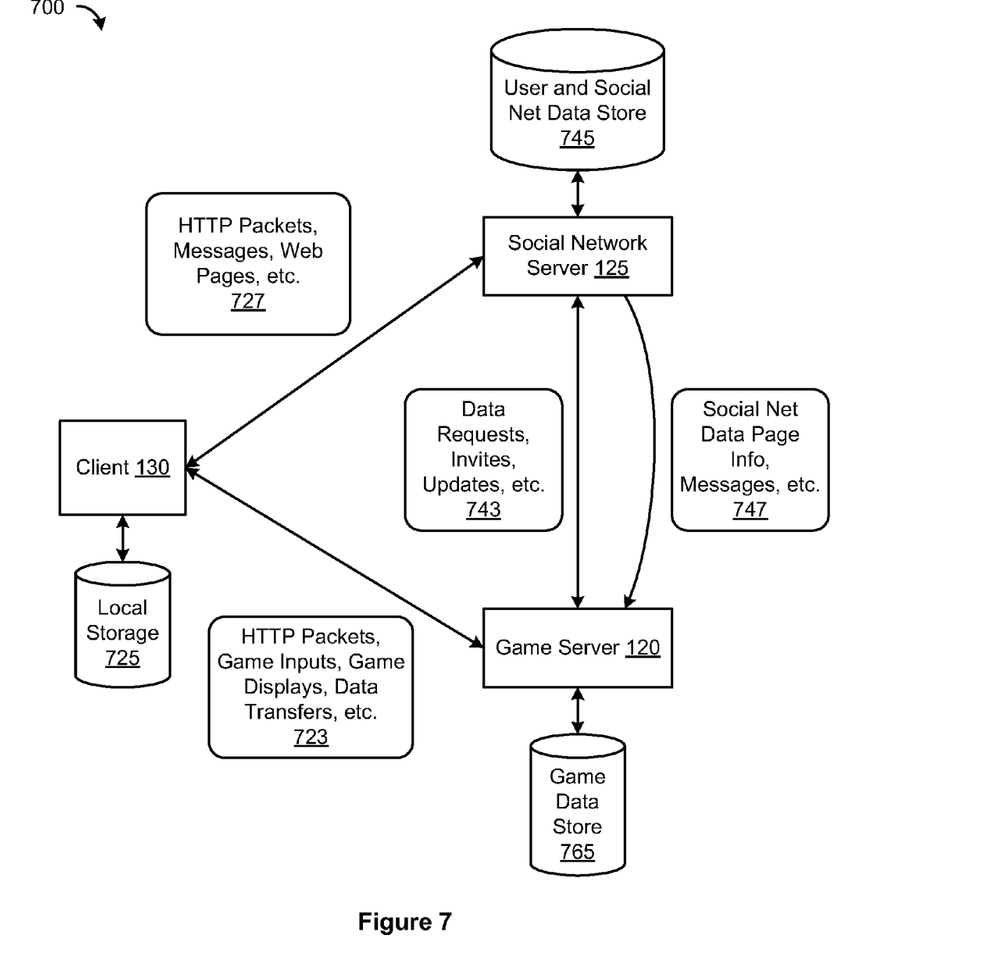
FIG. 7 illustrates a schematic of an example system and data flow for operating an online multi-player game, according to some embodiments.

FIG. 7 depicts a schematic of an example system 700 and data flow between the components of system 700 for operating an online multiuser social game. System 700 may include the client 130, the social network server 125, and the game server 120. The client 130, the social network server 125, and the game server 120 may each have a corresponding data store such as local storage 725, user and social network data store 745, and game data store 765, respectively. The client 130 may communicate with social network server 125 to receive web pages, messages, and the like. Additionally, the client 130 may transmit data to and receive data 723 (e.g., HTTP packets, game inputs, game displays, data transfers) from the game server 120. In a similar fashion, the game server 120 and the social network server 125 may communicate data 743 (e.g., data requests, invites, updates) with the social network server 125. The social network server 125 may communicate data 747 (e.g., social network data, page info, messages) with game server 120. As mentioned above, communication between the client 130, the social network server 125, and the game server 120 may occur over any appropriate electronic communication medium.

Example Machine

Figure 8:
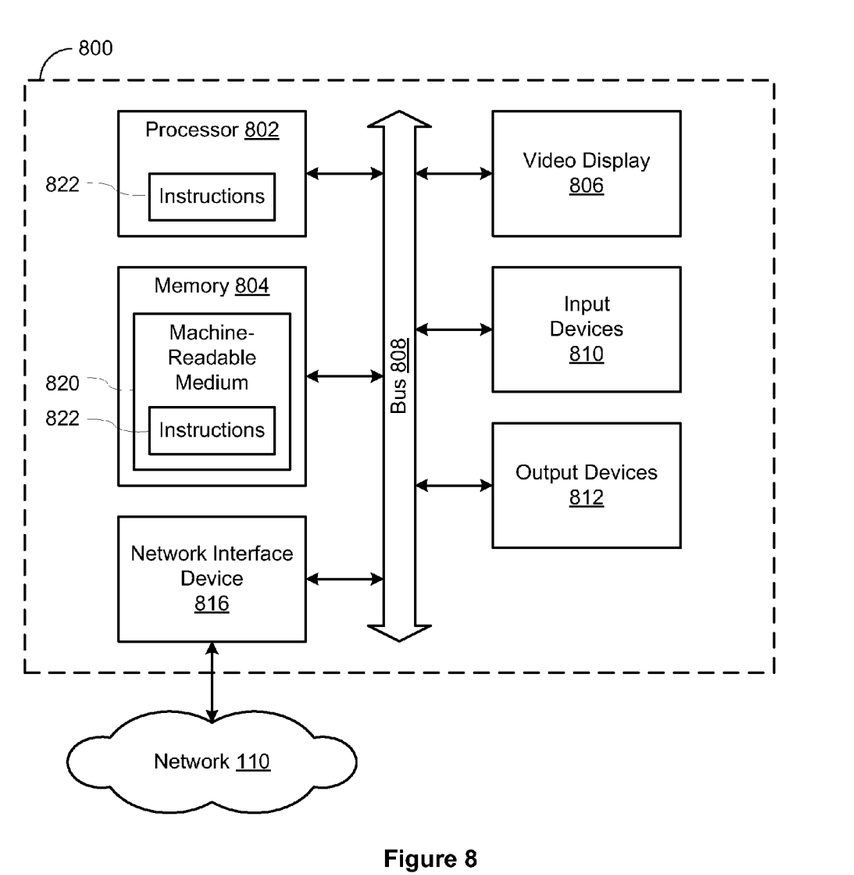
FIG. 8 is a block diagram illustrating an example machine for performing the methodologies described herein, according to some embodiments.

FIG. 8 depicts a block diagram of a machine in the example form of a computer system 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The computer system 800 may include, but is not limited to, a desktop computer system, a laptop computer system, a server, a mobile phone, a smart phone, a personal digital assistant (PDA), a gaming console, a portable gaming console, a set top box, a camera, a printer, a television set, or any other electronic device.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 800 includes a processor 802 (e.g., a central processing unit (CPU), a graphics processing unit (GPU) or both), and memory 804, which communicate with each other via bus 808. Memory 804 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 804 may optionally include one or more storage devices remotely located from the computer system 800. The computer system 800 may further include a video display unit 806 (e.g., a plasma display, a liquid crystal display (LCD) or a cathode ray tube (CRT)). The computer system 800 also includes input devices 810 (e.g., keyboard, mouse, trackball, touchscreen display, etc.), output devices 812 (e.g., speakers), and a network interface device 816. The aforementioned components of the computer system 800 may be located within a single housing or case (e.g., as depicted by the dashed lines in FIG. 8). Alternatively, a subset of the components may be located outside of the housing. For example, the video display unit 806, the input devices 810, and the output devices 812 may exist outside of the housing, but be coupled to the bus 808 via external ports or connectors accessible on the outside of the housing.

Memory 804 includes a machine-readable medium 820 on which is stored one or more sets of data structures and instructions 822 (e.g., software programs) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 822 may also reside, completely or at least partially, within memory 804 and/or within the processor 802 during execution thereof by computer system 800, with memory 804 and processor 802 also constituting machine-readable, tangible media.

The data structures and instructions 822 may further be transmitted or received over a network 110 via network interface device 816 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a processor 802 configured using software, the processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software, code, and/or instructions stored in a machine-readable medium) or permanently configured to perform the relevant operations. Whether temporarily or permanently configured, such processors 802 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 802 or processor-implemented (or computer-implemented) modules. Similarly, at least some of the operations of a method may be governed by instructions that are stored in a computer readable storage medium and executed by one or more processors 802 or processor-implemented (or computer-implemented) modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for modifying a game state of a player of a social game, comprising:
    receiving, from a device of the player by a hardware-implemented communication module, a selection of a first location for a first virtual object and a second location for a second virtual object in a virtual world of a social game, the first virtual object representing a first social contact of the player of the social game and the second virtual object representing a second social contact of the player of the social game;
    positioning, on a user interface of the social game, the first virtual object representing the first social contact at the first location and the second virtual object representing the second social contact at the second location;
    determining, by a hardware-implemented location module, a location adjacency metric for the first virtual object and the second virtual object using the first location and the second location, the location adjacency metric being a function of a distance between the first location and the second location in the virtual world;
    determining, by a hardware-implemented social module, a social adjacency metric for the first virtual object and the second virtual object, the social adjacency metric being a function of a social distance of a social connection in a social network external to the social game between the first social contact and the second social contact of the player;
    determining whether the first social contact and the second social contact of the player have an explicitly identified social connection within the social game in addition to the social connection in the social network external to the social game, the explicitly identified social connection within the social game having been previously identified by one of the first social contact or the second social contact;
    based on the first social contact and the second social contact having the explicitly identified social connection within the social game and the social connection in the social network external to the social game, weighting the social adjacency metric to reflect existence of both the explicitly identified social connection within the social game and the social connection in the social network external to the social game; and
    modifying, by a processor of a machine, the game state of the player of the social game, the modifying comprising updating the user interface to reflect adjusting of a game score of the player based on the location adjacency metric and the social adjacency metric.

2. The computer-implemented method of claim 1, wherein the social adjacency metric for the first social contact and the second social contact is based on the social network to which the player, the first social contact, and the second social contact belong.

3. The computer-implemented method of claim 1, wherein the social network is established in connection with a social networking system.

4. The computer-implemented method of claim 1, wherein the social network is established within the social game.

5. The computer-implemented method of claim 1, wherein the first location of the first virtual object and the second location of the second virtual object in the virtual world is determined by the player.

6. The computer-implemented method of claim 1, wherein the adjusting of the score of the player comprises increasing the game score of the player when the location adjacency metric for the first virtual object and the second virtual object indicates that the first location and the second location are within a first predetermined distance of each other in the virtual world and when the social adjacency metric for the first social contact and the second social contact indicates that the first social contact and the second social contact are within a second predetermined social distance of each other in the social network.

7. The computer-implemented method of claim 1, wherein the adjusting of the score of the player comprises decreasing the game score of the player when the location adjacency metric for the first virtual object and the second virtual object indicates that the first location and the second location are not within a first predetermined distance of each other in the virtual world and when the social adjacency metric for the first social contact and the second social contact indicates that the first social contact and the second social contact are within a second predetermined social distance of each other in the social network.

8. The computer-implemented method of claim 1, wherein modifying the game state of the player based on the location adjacency metric and the social adjacency metric further comprises increasing a happiness metric for the first virtual object and the second virtual object when the location adjacency metric for the first virtual object and the second virtual object indicates that the first location and the second location are within a first predetermined distance of each other in the virtual world and when the social adjacency metric for the first social contact and the second social contact indicates that the first social contact and the second social contact are within a second predetermined social distance of each other in the social network.

9. The computer-implemented method of claim 1, wherein modifying the game state of the player based on the location adjacency metric and the social adjacency metric further comprises decreasing a happiness metric for the first virtual object and the second virtual object when the location adjacency metric for the first virtual object and the second virtual object indicates that the first location and the second location are not within a first predetermined distance of each other in the virtual world and when the social adjacency metric for the first social contact and the second social contact indicates that the first social contact and the second social contact are within a second predetermined social distance of each other in the social network.

10. The computer-implemented method of claim 1, wherein the first virtual object is a first character representing the first social contact in the virtual world.

11. The computer-implemented method of claim 1, wherein the second virtual object is a second character representing the second social contact in the virtual world.

12. The method of claim 1, wherein the social connection in the social network external to the social game is different from the explicitly identified social connection within the social game.

13. A system to modify a game state of a player of a social game, comprising:
  a processor of a machine;
  a communication module configured to receive, from a device of the player, a selection of a first location for a first virtual object and a second location for a second virtual object in a virtual world of a social game, the first virtual object representing a first social contact of the player of the social game and the second virtual object representing a second social contact of the player of the social game, the first virtual object being positioned at the first location and the second virtual object being positioned at the second location on a user interface of the social game;
  a location module configured to
    determine a location adjacency metric for the first virtual object and the second virtual object using the first location and the second location, the location adjacency metric being a function of a distance between the first location and the second location in the virtual world;
  a social module configured to:
    determine a social adjacency metric for the first virtual object and the second virtual object, the social adjacency metric being a function of a social distance of a social connection in a social network external to the social game between the first social contact and the second social contact of the player;
    determine whether the first social contact and the second social contact of the player have an explicitly identified social connection within the social game in addition to the social connection in the social network external to the social game, the explicitly identified social connection within the social game having been previously identified by one of the first social contact or the second social contact;
    based on the first social contact and the second social contact having the explicitly identified social connection within the social game and the social connection in the social network external to the social game, weigh the social adjacency metric to reflect existence of both the explicitly identified social connection within the social game and the social connection in the social network external to the social game, and
  a game module configured to modify, using the processor of the machine, the game state of the player, the modifying comprising updating the user interface to reflect adjusting of a game score of the player based on the location adjacency metric and the social adjacency metrics.

14. The system of claim 13, wherein the social adjacency metric for the first social contact and the second social contact is based on the social network to which the player, the first social contact, and the second social contact belong.

15. The system of claim 13, wherein the social network is established in connection with a social networking system.

16. The system of claim 13, wherein the first location of the first virtual object and the second location of the second virtual object in the virtual world is determined by the player.

17. The system of claim 13, wherein the adjusting of the score of for the player comprises increasing the game score of the player when the location adjacency metric for the first virtual object and the second virtual object indicates that the first location and the second location are within a first predetermined distance of each other in the virtual world and when the social adjacency metric for the first social contact and the second social contact indicates that the first social contact and the second social contact are within a second predetermined social distance of each other in the social network.

18. The system of claim 13, wherein the adjusting of the score of the player comprises decreasing the game score of the player when the location adjacency metric for the first virtual object and the second virtual object indicates that the first location and the second location are not within a first predetermined distance of each other in the virtual world and when the social adjacency metric for the first social contact and the second social contact indicates that the first social contact and the second social contact are within a second predetermined social distance of each other in the social network.

19. The system of claim 13, wherein when modifying the game state of the player based on the location adjacency metric and the social adjacency metric, the game module is further configured to increase the value by increasing a happiness metric for the first virtual object and the second virtual object when the location adjacency metric for the first virtual object and the second virtual object indicates that the first location and the second location are within a first predetermined distance of each other in the virtual world and when the social adjacency metric for the first social contact and the second social contact indicates that the first social contact and the second social contact are within a second predetermined social distance of each other in the social network.

20. The system of claim 13, wherein when modifying the game state for the player based on the location adjacency metric and the social adjacency metric, the game module is further configured to decrease the value by decreasing a happiness metric for the first virtual object and the second virtual object when the location adjacency metric for the first virtual object and the second virtual object indicates that the first location and the second location are not within a first predetermined distance of each other in the virtual world and when the social adjacency metric for the first social contact and the second social contact indicates that the first social contact and the second social contact are within a second predetermined social distance of each other in the social network.

21. A non-transitory machine-readable storage medium storing instructions that, when executed by at least one processor, cause the at least one processor to perform operations comprising:

receiving, from a device of player, a selection of a first location for a first virtual object and a second location for a second virtual object in a virtual world of a social game, the first virtual object representing a first social contact of a player of the social game and the second virtual object representing a second social contact of the player of the social game;

positioning, on a user interface of the social game, the first virtual object representing the first social contact at the first location and the second virtual object representing the second social contact at the second location;

determining a location adjacency metric for the first virtual object and the second virtual object using the first location and the second location, the location adjacency metric being a function of a distance between the first location and the second location in the virtual world;

determining a social adjacency metric for the first virtual object and the second virtual object, the social adjacency metric being a function of a social distance of a social connection in a social network external to the social game between the first social contact and the second social contact of the player;

determining whether the first social contact and the second social contact of the player have an explicitly identified social connection within the social game in addition to the social connection in the social network external to the social game, the explicitly identified social connection within the social game having been previously identified by one of the first social contact or the second social contact;

based on the first social contact and the second social contact having the explicitly identified social connection within the social game and the social connection in the social network external to the social game, weighting the social adjacency metric to reflect existence of both the explicitly identified social connection within the social game and the social connection in the social network external to the social game; and modifying a game state for the player, the modifying comprising updating the user interface to reflect adjusting of a game score of the player based on the location adjacency metric and the social adjacency metric.

* * * * *

UNITED STATES PATENT AND TRADEMARK OFFICE
CERTIFICATE OF CORRECTION

PATENT NO. : 9,501,203 B1
APPLICATION NO. : 13/162027
DATED : November 22, 2016
INVENTOR(S) : Rohrl et al.

It is certified that error appears in the above-identified patent and that said Letters Patent is hereby corrected as shown below:

On the Title Page

Item (75), in "Inventors", in Column 1, Line 1, delete "Pacifica," and insert --San Francisco,--, therefor In the Claims In Column 18, Line 9, in Claim 13, delete "game," and insert --game;--, therefor In Column 18, Line 15, in Claim 13, delete "metrics." and insert --metric.--, therefor In Column 19, Line 13, in Claim 21, after "device of", insert --a--, therefor Signed and Sealed this
Twenty-ninth Day of May, 2018

Andrei Iancu
*Director of the United States Patent and Trademark Office*